(12) United States Patent
Marks

(10) Patent No.: US 10,868,940 B2
(45) Date of Patent: Dec. 15, 2020

(54) DUPLEX SCANNING CONTENT ALIGNMENT

(71) Applicant: TOSHIBA TEC KABUSHIKI KAISHA, Tokyo (JP)

(72) Inventor: Mitchell G. Marks, Manly (AU)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/526,725

(22) Filed: Jul. 30, 2019

(65) Prior Publication Data

US 2020/0076985 A1 Mar. 5, 2020

Related U.S. Application Data

(60) Provisional application No. 62/726,766, filed on Sep. 4, 2018.

(51) Int. Cl.
| | | |
|---|---|---|
| *H04N 1/387* | (2006.01) | |
| *H04N 1/40* | (2006.01) | |
| *H04N 1/195* | (2006.01) | |
| *H04N 1/409* | (2006.01) | |

(52) U.S. Cl.
CPC ....... *H04N 1/3878* (2013.01); *H04N 1/19589* (2013.01); *H04N 1/40012* (2013.01); *H04N 1/4095* (2013.01)

(58) Field of Classification Search
CPC ............... A61B 1/0005; A61B 1/2676; A61B 2034/105; A61B 2034/2051; A61B 2090/364; A61B 2090/3735; A61B 2090/3782; A61B 2090/3966; A61B 34/20; A61B 5/0035; A61B 5/0066; A61B 5/0084; A61B 5/0095; A61B 5/062; A61B 5/1076; A61B 5/1079; A61B 5/4887; G03F 7/70358; G03F 7/70425; G03F 9/7076; G03F 9/7084; G03G 15/235; G03G 15/6555; G03G 15/6567; G03G 15/6579
USPC ......................................... 358/474
See application file for complete search history.

(56) References Cited

U.S. PATENT DOCUMENTS

| | | | |
|---|---|---|---|
| 6,813,000 B1 * | 11/2004 | Nishi | G03F 7/70358 355/53 |
| 7,456,995 B2 | 11/2008 | Stephens | |
| 9,189,180 B1 * | 11/2015 | Geering | G06F 3/1288 |
| 2007/0057444 A1 * | 3/2007 | Sagawa | B65H 3/047 271/225 |
| 2007/0077980 A1 * | 4/2007 | Marks | G07F 17/34 463/16 |
| 2007/0080819 A1 * | 4/2007 | Marks | G08B 29/145 340/628 |
| 2007/0291327 A1 * | 12/2007 | Saito | G03G 15/235 358/496 |

(Continued)

*Primary Examiner* — Negussie Worku
(74) *Attorney, Agent, or Firm* — Kim & Stewart LLP

(57) ABSTRACT

There is disclosed an apparatus and method of aligning content put through a duplex scanner. By performing operations on data extracted from physical documents, digital documents that would otherwise appear skewed can be un-skewed. The process compares two images, e.g. a front and a back page for a document, and determines how they are offset from one another. The process uses a projection profile error minimization technique to calculate a translation for one or both pages to digitally align the margins for a digital document such that the margins match.

18 Claims, 16 Drawing Sheets

(56) References Cited

U.S. PATENT DOCUMENTS

| | | | |
|---|---|---|---|
| 2008/0070681 A1* | 3/2008 | Marks | G07F 17/3213 |
| | | | 463/27 |
| 2008/0090644 A1* | 4/2008 | Marks | G07F 17/32 |
| | | | 463/20 |
| 2009/0087237 A1* | 4/2009 | Sato | G03G 15/234 |
| | | | 399/381 |
| 2016/0231020 A1* | 8/2016 | Gao | H05B 3/06 |
| 2019/0033770 A1* | 1/2019 | Shiokawa | G03G 15/6555 |
| 2019/0147286 A1* | 5/2019 | Marks | G06K 9/18 |
| | | | 382/321 |
| 2019/0352972 A1* | 11/2019 | Adams | E21B 10/322 |

* cited by examiner

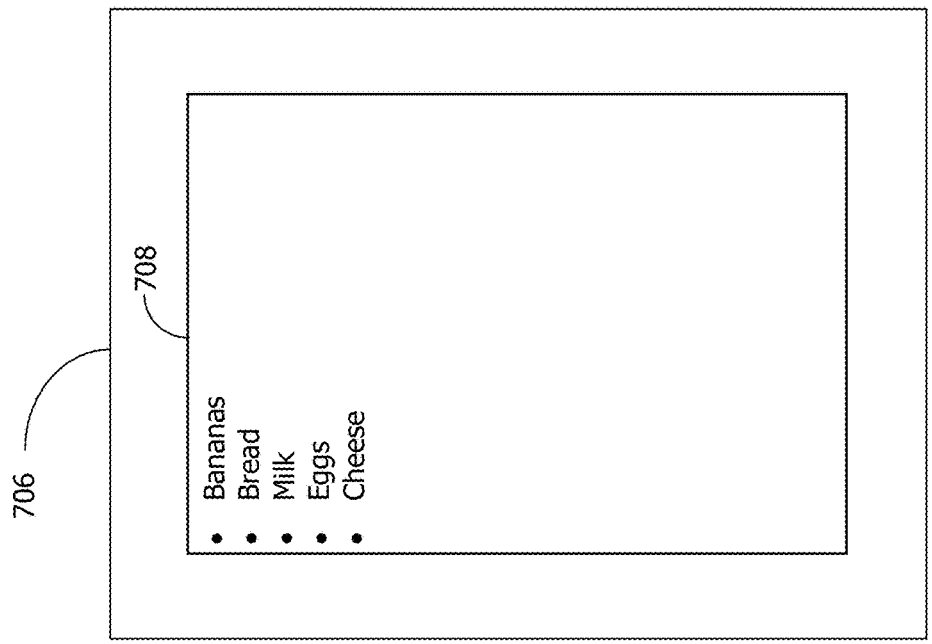
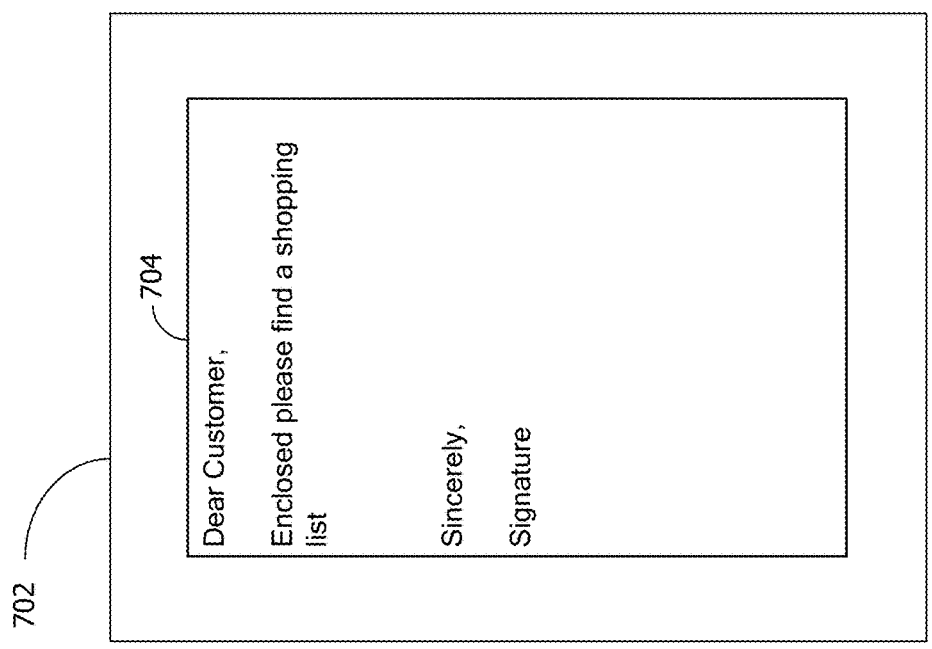
FIG. 7

806

- Bananas
- Bread
- Milk
- Eggs
- Cheese

802

Dear Customer,

Enclosed please find a shopping list.

Sincerely,

Signature 812
814
816

FIG. 8

DUPLEX SCANNING CONTENT ALIGNMENT

RELATED APPLICATION INFORMATION

This patent claims priority from U.S. provisional patent application No. 62/726,766 filed Sep. 4, 2018 and entitled "System and Method for Duplex Scan Content Alignment on MFP devices".

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to scanning documents for printing.

Description of the Related Art

Duplex printers have been in use for many years. When users need to scan or copy multiple documents, rather than scan each side of each document one by one, a user may put multiple documents into a document feeder which then scans both sides of the documents. The problem with these scanners and document feeders is that often times the front and back page of the digital documents are horizontally misaligned due to the nature of scanning the front and back side of a physical document at the same time. Multiple mechanical systems have been devised that try to make a physical document put through a feeder, feed through the right time, but these systems never lead to acceptable results. There needs to be a system that can automatically, without the aid of a human, identify that a document fed through a scanner is misaligned and realign the front and back page with minimal to know user intervention. The present disclosure deals with this problem.

DESCRIPTION OF THE DRAWINGS

FIG. 7 is a view of the front and back pages of a sheet of scanned and printed paper showing a front and back page properly aligned.

FIG. 8 is a view of the front and back pages of a sheet of scanned paper showing front and back page partitions.

Throughout this description, elements appearing in figures are assigned three and four-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

The present disclosure provides a system and method for multi-function printer duplex scan content alignment. In some instances, alignment is accomplished via document image de-skewing and projection profile analysis. Duplex scan content alignment is a term used to define the method of correctly de-skewing and aligning 'front' and 'back' pages in a duplex scan output from the MFP's automatic document feeder (ADF). The present disclosure is concerned with the correction of the hardware limitations inherent in some ADF scan workflows that result in misaligned duplex pages (e.g. a front and a back page) as documents are scanned. It is specifically not a generic content centering/alignment system. The main issue within the duplex pairs is that on each "back" page, the image content is often horizontally shifted further away from the x-axis image origin compared to the "front" page. The issue is prevalent because the ADF hardware often cannot perfectly engage with the leading edge of a sheet of paper as it is fed through the scanning mechanism. This also occurs more frequently in cases where the ADF hardware is comprised of a dual scanner, a system where two sensors scan the front and back pages simultaneously, as opposed to two-pass methods that uses a single sensor with the page flipped in-between scanning processes.

Description of Apparatus

Figure 1:
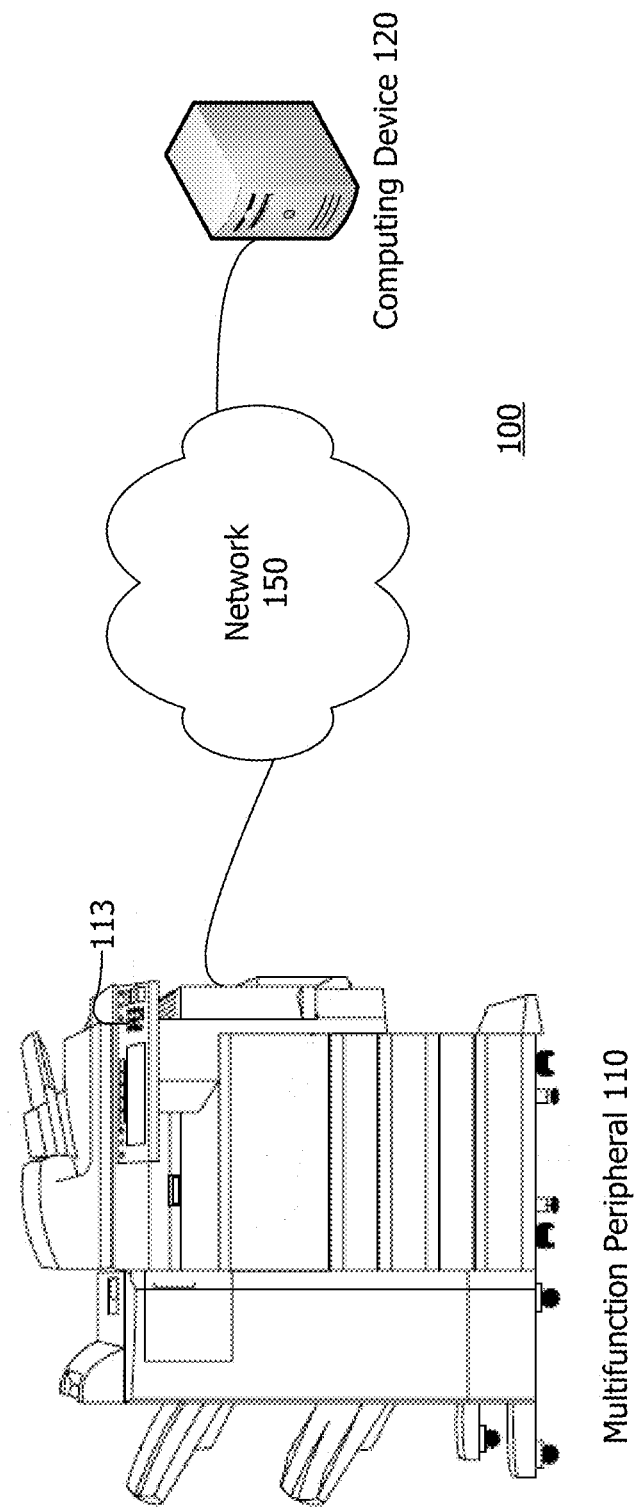
FIG. 1 is an overview of a system networked to print documents.

Referring now to FIG. 1 we see a printing system with multiple components. There is a multifunction peripheral 110 and a computing device 120, both of which may be interconnected using a network 150.

A multifunction peripheral (MFP), like multifunction peripheral 110, is a type of document processing device which is an integrated device providing at least two document processing functions, such as print, copy, scan and fax. In a document processing function, an input document (electronic or physical) is used to automatically produce a new output document (electronic or physical).

Multifunctional peripheral 110 may receive instructions to scan a document. Those instructions may come directly from a user interface 113 present on the multifunction peripheral 110 or, in some cases, from desktop computer 120 or other computer (e.g. a mobile device (not shown)). In other instances, a user inserting documents into a document feeder on multifunction peripheral 110 may trigger the entire system to start scanning. Program instructions for duplex scanning content alignment may be stored on the multifunctional peripheral 110 itself or be stored on the computing device 120. The instructions may even be stored remotely on some other device available via the network 150. Network 150 may be or include the internet or may be a private network.

Figure 2:
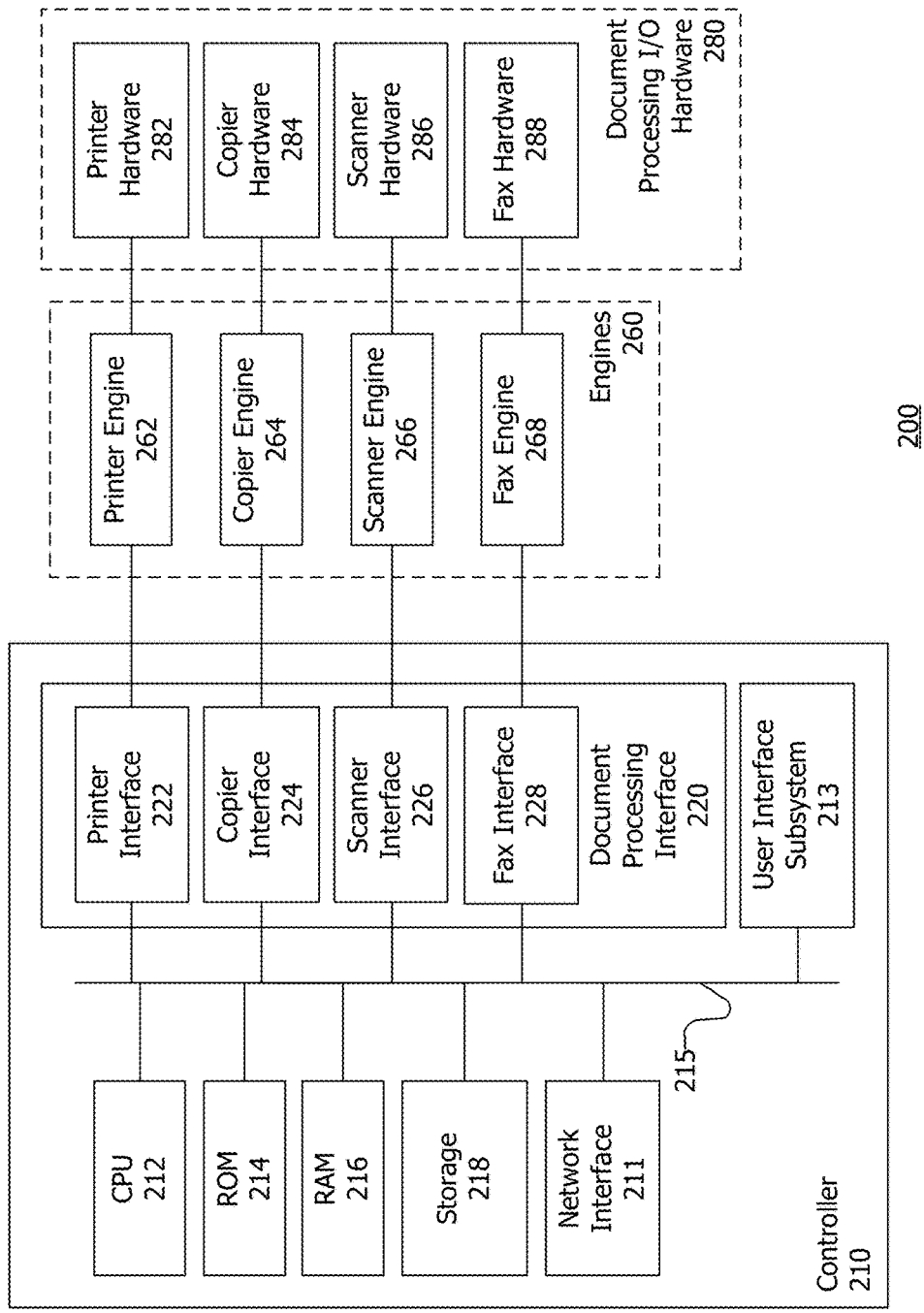
FIG. 2 is a block diagram of an MFP.

FIG. 2 is a block diagram of an MFP 200 which may be the document processing device 110. The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2 there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing, I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state. The three storage components, ROM 214, RAM 216 and storage 218 may be combined or distributed in other ways, and may be implemented through SAN, NAS, cloud or other storage systems.

The network interface 211 interfaces the MFP 200 to a network, such as the network 150 (FIG. 1), allowing the MFP 200 to communicate with other devices.

The bus 215 enables data communication between devices and systems within the MFP 200. The bus 215 may conform to the PCI Express or other bus standard.

While in operation, the MFP 200 may operate substantially autonomously. However, the MFP 200 may be controlled from and provide output to the user interface subsystem 213.

The document processing interface 220 may be capable of handling multiple types of document processing operations and therefore may incorporate a plurality of interfaces 222, 224, 226 and 228. The printer interface 222, copier interface 224, scanner interface 226, and fax interface 228 are examples of document processing interfaces. The interfaces 222, 224, 226 and 228 may be software or firmware.

Each of the printer engine 262, copier engine 264, scanner engine 266 and fax engine 268 interact with associated printer hardware 282, copier hardware 284, scanner hardware 286 and facsimile hardware 288, respectively, in order to complete the respective document processing functions. The printer hardware 282 may include printing hardware (e.g. print colorant or toner, colorant reservoirs, print rollers, memory sufficient to store data pertaining to, data in memory or buffers, and other printer hardware).

Figure 3:
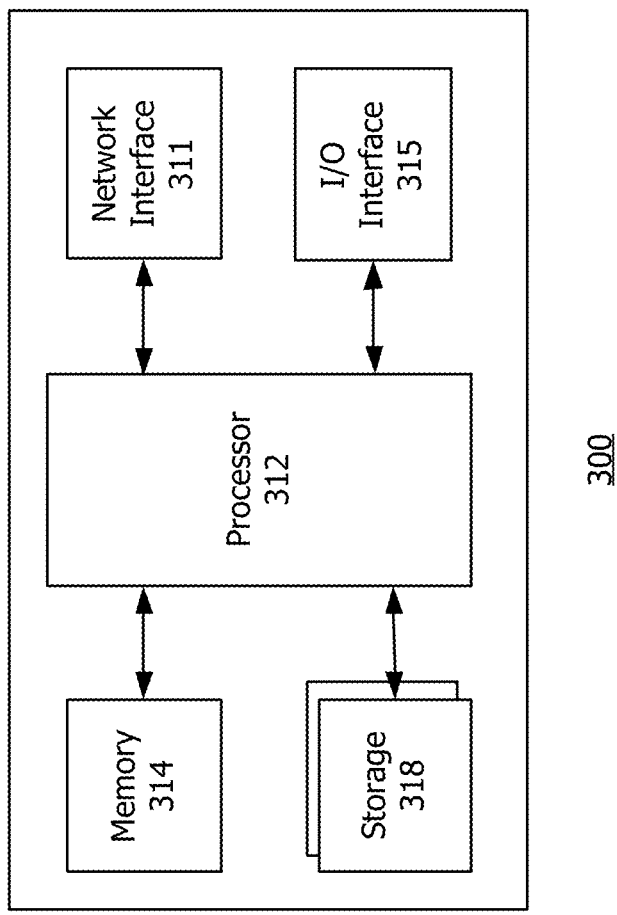
FIG. 3 is a block diagram of a computing device.

Turning now to FIG. 3, a block diagram of a computing device is shown. The computing device 300 may be representative of the server computers, client devices, mobile devices and other computing devices discussed herein. The MFP typically is or includes a computing device. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 may have a processor 312 coupled to a memory 314, storage 318, a network interface 311 and an I/O interface 315. The processor may be or include one or more microprocessors and application specific integrated circuits (ASICs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312. As used herein, the word memory specifically excludes transitory medium such as signals and propagating waveforms.

The storage 318 may provide non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage. As used herein, the word storage specifically excludes transitory medium such as signals and propagating waveforms.

The network interface 311 may be configured to interface to a network such as network 150 (FIG. 1).

The I/O interface 315 may be configured to interface the processor 312 to peripherals (not shown) such as displays, keyboards and USB devices.

Description of Processes

Figure 4:
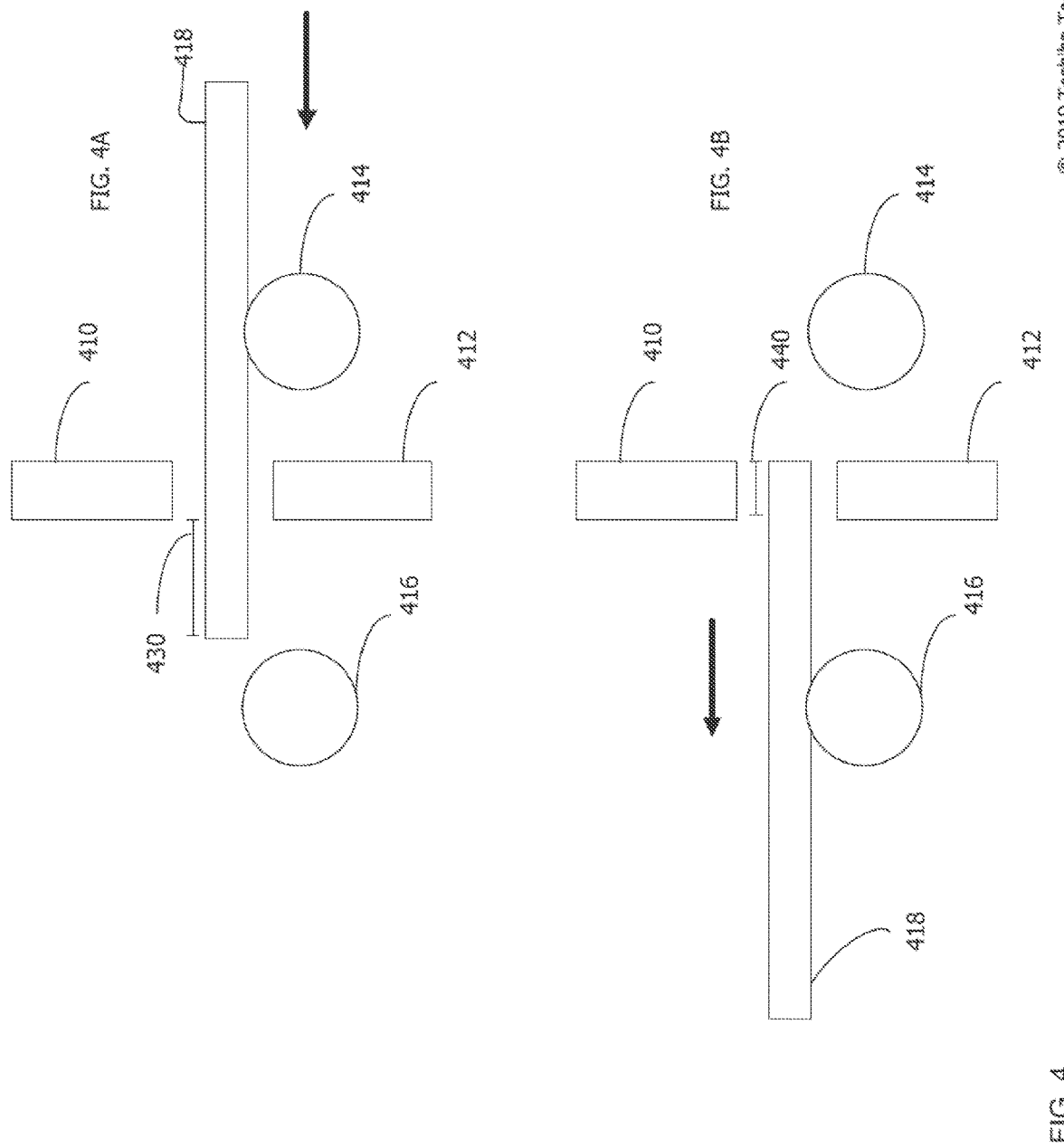
FIG. 4, made up of FIGS. 4A and 4B, is a side view of a sheet of paper being fed through a duplex scanner demonstrating how document misalignment typically occurs.

FIG. 4, made up of FIGS. 4A and 4B, is a side view of a paper being fed through a duplex scanner demonstrating how document misalignment typically occurs. Beginning with FIG. 4A, document 418 is being fed through roller 414 from right to left. As the document is fed, it passes over roller 414 and scanning begins simultaneously using document scanner 410 and document scanner 412. The leading edge 430 has a certain width before scanning begins as seen in FIG. 4.

Turning to FIG. 4B, which follows FIG. 4A, document 418 passes over roller 416. The trailing edge 440 is significantly smaller than the leading edge 430. This may be due to the depth of the scanners 410 and 412 hardware itself, the placement of the rollers relative to the scanners 410 and 412. As a result, even when the pages are duplex scanned by two scanners 410 and 412 simultaneously, the content margins on the front and back page may be different. This is one example which causes a horizontal shift. In other cases, especially single scanner systems, the passing of the page through a first time and a second time often introduces different margins as well. Depending on the orientation of the paper, for example long-edge feed or short-edge feed, the misalignment may occur horizontally or vertically over the scanned page.

Figure 5:
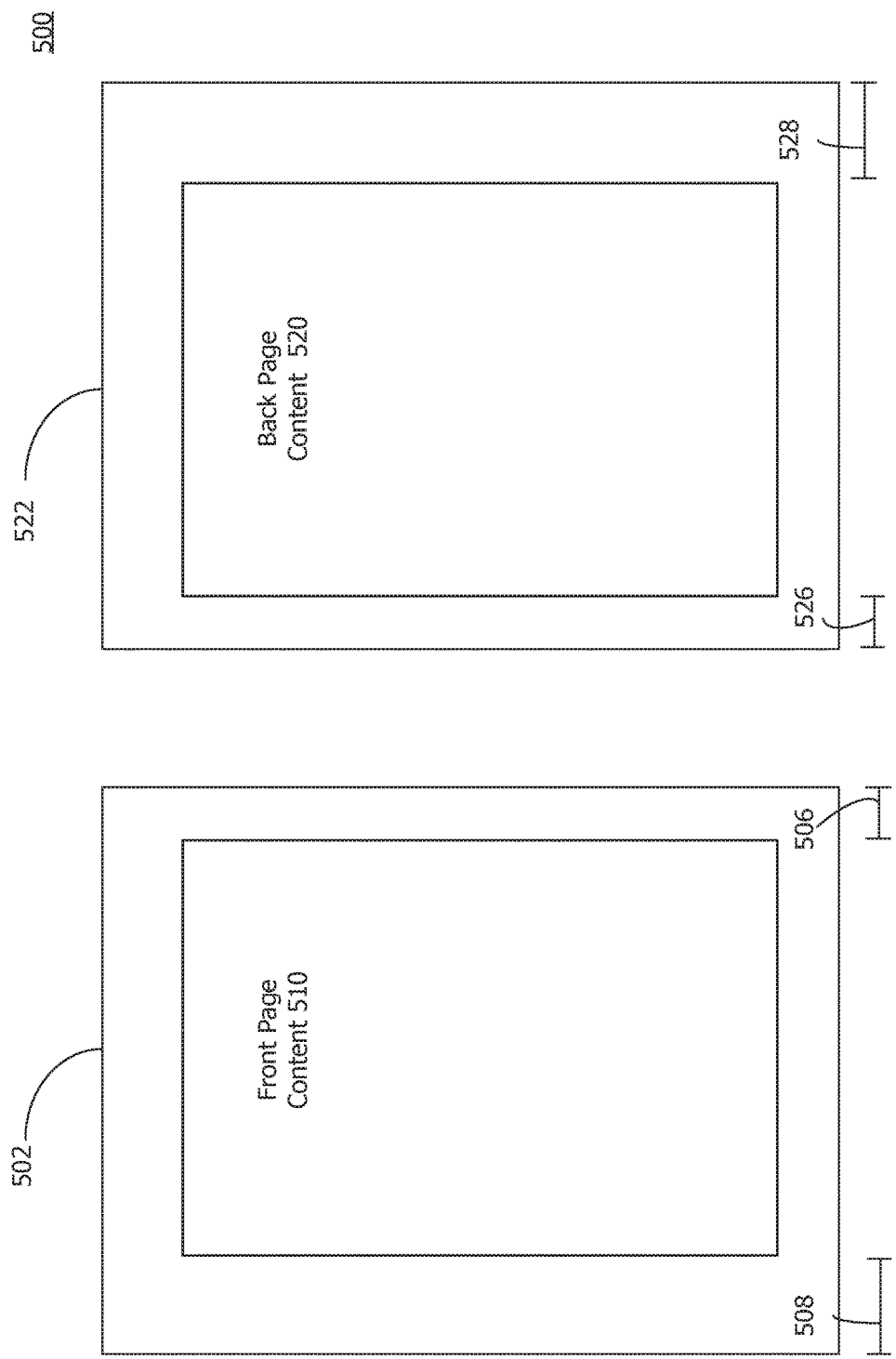
FIG. 5 is a view of the front and back pages of a sheet of a scanned and printed paper showing a front and back page may be misaligned.

FIG. 5 is a view of the front and back pages of a sheet of a scanned and printed paper showing front and back page that may be misaligned. Here, front page 502 and back page 522 correspond to a digital document (or image) made once a physical document has been scanned as shown in FIG. 4. Front page 502 and back page 522 both contain content, front page content 510 and back page content 520 respectively. The content may be text, images, or other content. The margins 528 and 508 may correspond with one another, while margins 506 and 526 may correspond. Or, they may not. Regardless, the left margins 508 and 526 do not align with the right margins 506 and 528. Accordingly, misalignment has occurred. Misalignment may make it unpleasant to read the digital document, and make the digital document look different from the physical document that was originally scanned.

Figure 6:
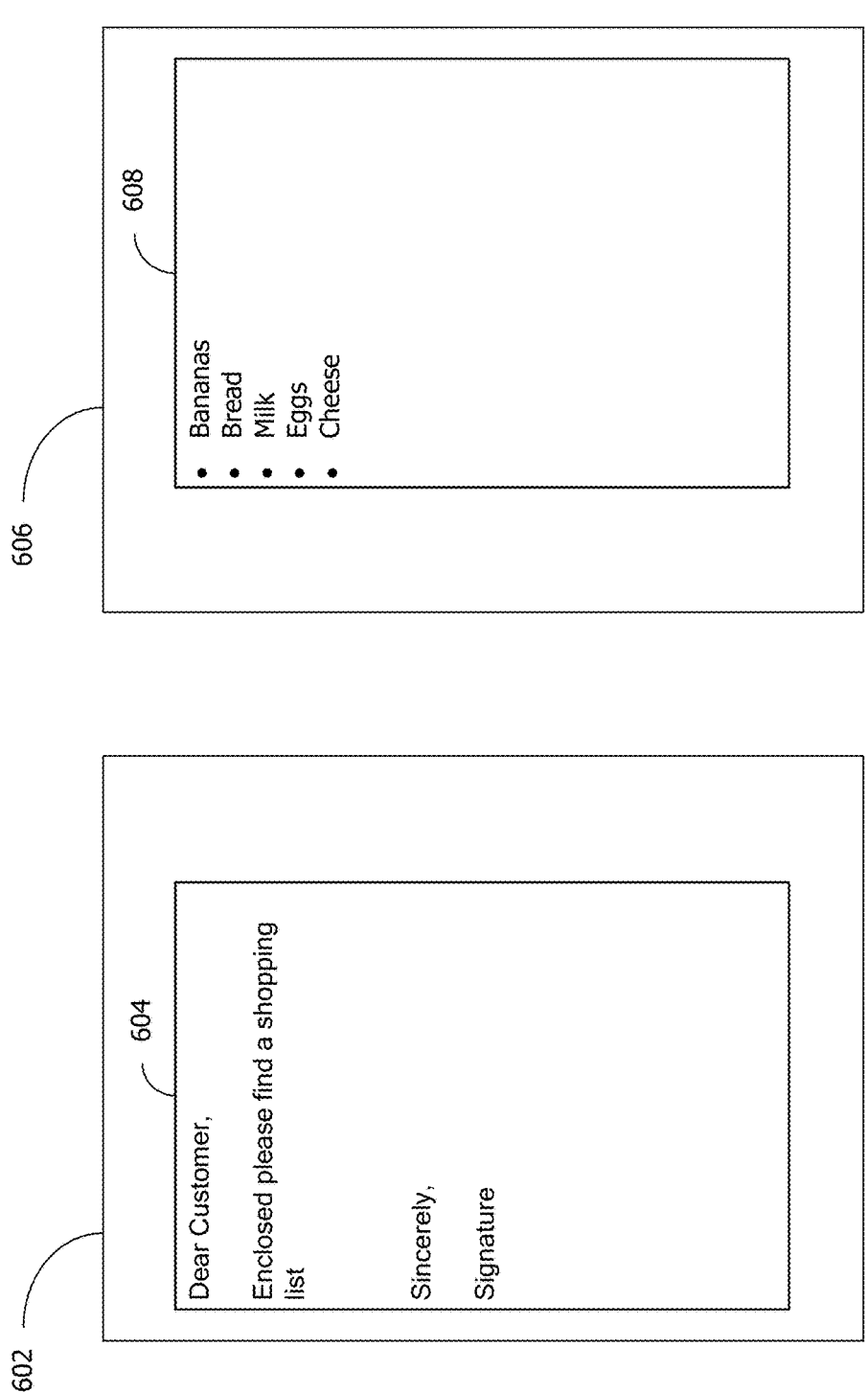
FIG. 6 is another view of the front and back pages of a sheet of a scanned and printed paper showing a front and back page may be misaligned.

FIG. 6 is another view of the front and back pages of a sheet of a scanned and printed paper showing a front and back page may be misaligned. Coupling the duplex alignment issue with the document image skew that is sometimes observable when scanning through ADF's, the requirement to improve output quality from the ADF due to hardware limitations is quite apparent. FIG. 6 exemplifies the situation. We have yet again a front page 602 and back page 606. The front page 602 has contents 604, that are misaligned, while the back page 606 also has contents 608 that are also misaligned. It would be preferred, where this problem cannot be solved through hardware, to correct it automatically using software.

FIG. 7 is a view of the front and back pages of a sheet of scanned and printed paper showing a front and back page properly aligned. This may take place normally in some cases, but as relevant to this disclosure, after the processes described below take place. Here, the front page content 704 on front page 702 has been aligned with the back page content 708 on back page 706.

The present patent solves the problem of misalignment, generally by two processes. Firstly, to ensure that the document image content is orthogonal, a page skew detection algorithm is employed to determine if the page content requires skew correction. If skew correction is required, each document image is rotated accordingly. Following this step, a content alignment algorithm is performed on the duplex pair, to correct for the hardware limitations inherent in the ADF scanning mechanism. In some instances, a projection profile error minimization (PPEM) algorithm processes each of the duplex pairs. PPEM operates by inspecting the horizontal projection profile of each duplex pair, and horizontally translates the image by the x-offset value that minimizes the projection profile error between the 'front' and 'back' page.

FIG. 8 is a view of the front and back pages of a sheet of scanned paper showing front and back page partitions. FIG. 8, shows the document of FIG. 7 separated into page partitions. It is possible to perform PPEM on a set of 'n' page partitions like those shown in FIG. 8. The PPEM process will be discussed in more detail below with reference to FIGS. 11-13.

Across the page partitions, the translation value corresponding to the minimum PPEM result may be used as the translation alignment value. FIG. 8 corresponds to n=6 because there are 6 page partitions created by 7 lines. FIG. 8 shows front page 802 and back page 806. This time, page partitions, 812 and 814 have been introduced. The page partitions are created by lines such as line 816 running across both front page 802 and back page 806.

It may be important for alignment to maintain the minimum PPEM result from each duplex pair across the entire scanned document (e.g. across a multi-page document). Translating the content of the documents and using a determined PPEM offset value leads to favorable results. Additionally, if PPEM results in an unsuitable minimum error or an unsuitable translation value, an empirical translation value may be used. An example of an unsuitable minimum error would be an error obtained from a page partition that does not contain content (e.g. the user scans 30 documents front and back, but some of the pages have no content on the back page). Similarly, an example of an unsuitable translation value is a translation value that exceeds the maximum possible horizontal alignment offset required based on the hardware limitations.

Figure 9:
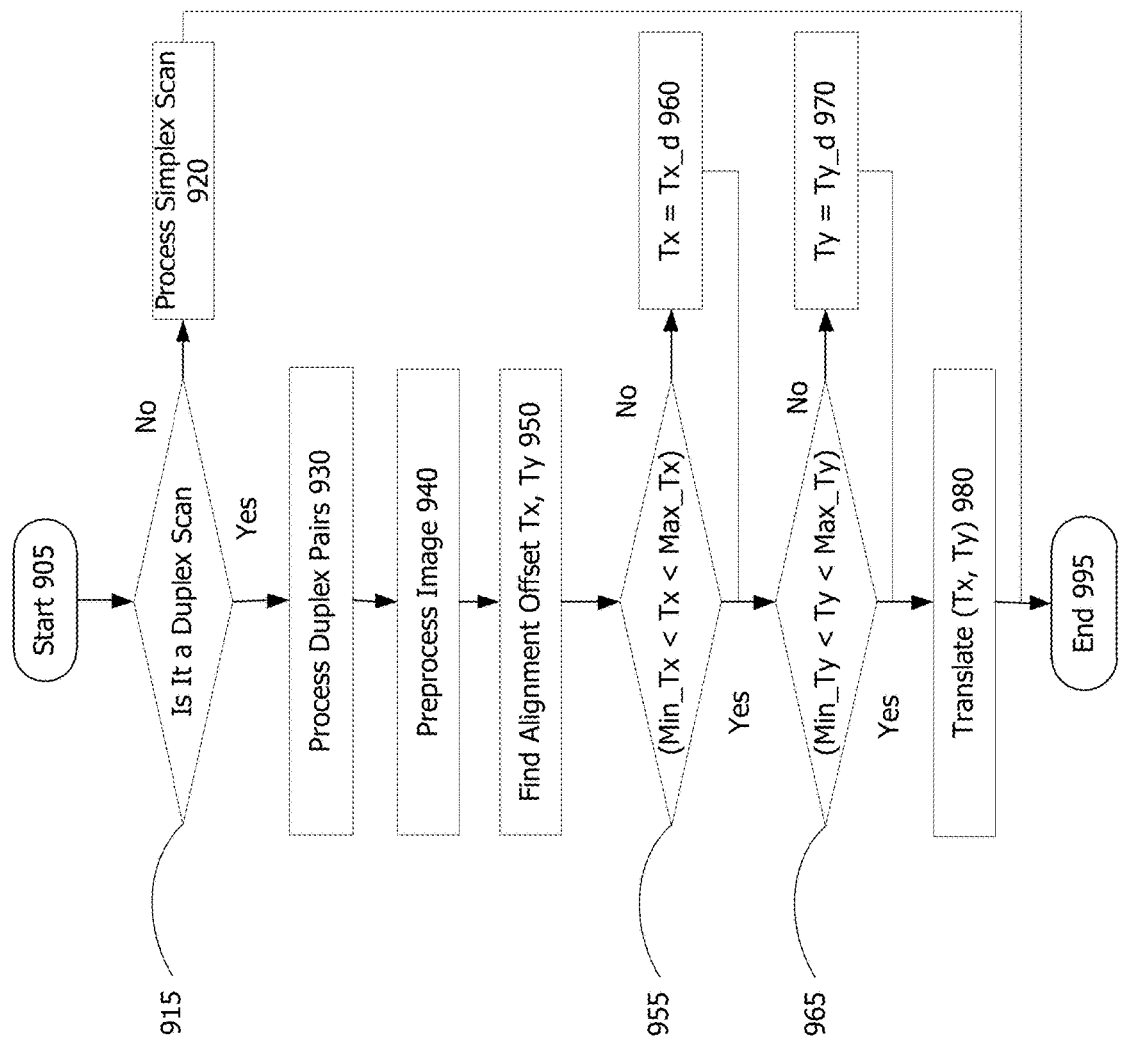
FIG. 9 is a flowchart of a process of document alignment.

FIG. 9 is a flowchart of a process of document alignment. In general, the subject disclosure provides a system and method for MFP duplex scan content alignment. In some instances, MFP duplex scan content alignment is achieved via projection profile analysis and projection profile error minimization. The system includes an automatic document feeder for feeding duplex documents into a scanner which scans the duplex document into a digital form. The automatic document feeder can be any part of an MFP that feeds a document into a scanner. Often times, the automatic document feeder can have a tray or rollers on it to facilitate moving documents into an MFP. A scanner may either be a single scanner or multiple scanners that work to capture data that can be used to make a digital file from a physical document fed through a scanner. For example, a pair of scanners (or more) may simultaneously be capable of scanning each side of a single document sheet. Or, one scanner may be used and the associated document flipped in order to scan both sides. The MFP may also include a computing device that manipulates data, for example, to perform the document alignment correction discussed herein. In other cases, separate computing devices may be used or involved. Finally, an output file may be produced which is a digital file where the contents of the input documents have been aligned properly.

Start 905 corresponds to the initiation of an ADF scanning workflow on an MFP. At the start 905, a user likely puts physical documents into a scanner and begins the entire scanning process. A determination is made whether or not the scan to be conducted is a duplex scan at 915. This may be based upon user input settings, or a detection of a multipage document, or the detection of multi-sided document content.

If the scan job is not duplex ("no" at 915), then a simplex scan job is processed at 920. This process is not described herein in detail because it is not relevant to this disclosure. The process then ends at 995.

If it is a duplex scan ("yes" at 915), then the duplex pairs are processed (i.e. scanned) to extract data from the physical document pages at 930. Then the digital files created from the physical documents will be preprocessed at 940. Preprocessing 940 is an iterative process whereby the system begins processing duplex pairs for scan content alignment. Preprocessing 940 consists of multiple operations performed on data of the digital images, these preprocesses are further described in FIG. 10, below.

Next, alignment offsets Tx, Ty are found at 950. Finding alignment offset values (e.g. conducting projection profile analysis for error minimization), and determining Tx and Ty is important to enable the further processing of the digital documents. The process is described in more detail with reference to FIG. 10.

Once the Tx and Ty values are found, several determinations are made. First, if Tx is not within a desired minimum of Tx, Min_Tx and a desired maximum of Tx, Max_Tx ("no" at 955), then a default alignment is used which may be based upon an empirical determination relevant to a particular MFP. This is the setting of Tx=Tx_d at 960.

If Tx is within a valid range ("yes" at 955), then the process proceeds to check the vertical alignment as well at 965. Specifically, if Ty is not within a desired minimum of Ty, Min_Ty and a desired maximum of Ty, Max_Ty ("no" at 965), then a default value Ty_d is used for Ty at 970. If Ty is in a valid range or after use of the default value, then the Tx and Ty values are translated 980 such that they match for each page of the associated document (e.g. so that the margins on all documents match). Then, the process ends at 995.

Figure 10:
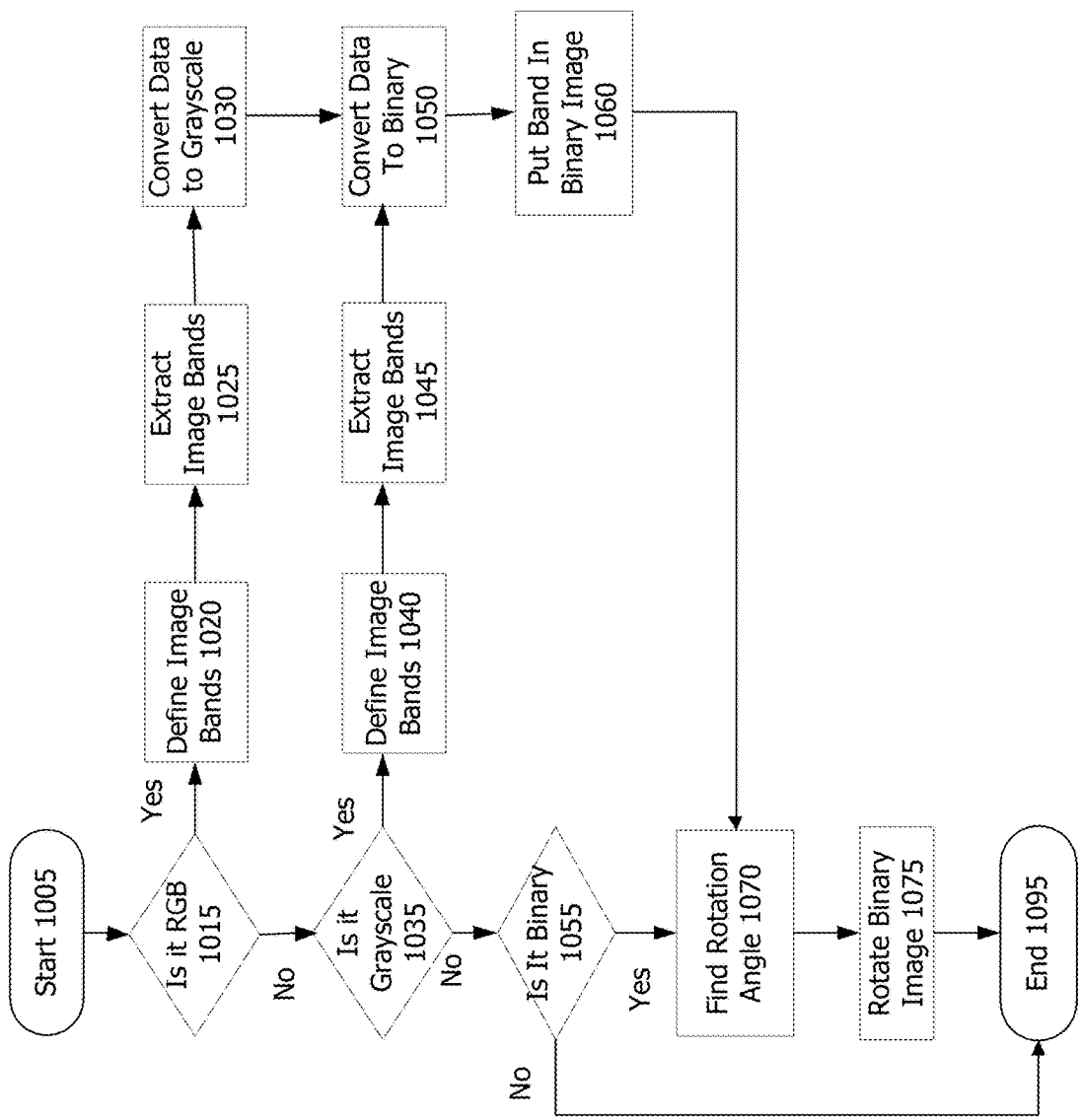
FIG. 10 is a flowchart of a process of preprocessing the image from FIG. 9.

FIG. 10 is a flowchart of a process of preprocessing the image 940 from FIG. 9. The pre-processing process begins following the start at 1005. After the start 1005 when a document image has been received, a determination is made whether the image is RGB, meaning, whether the document is encoded in color using the RGB colorspace. In order for the preprocessing to take place, the document image being processed must be in binary. But, a direct conversion to binary is usually quite grainy. Accordingly, an intermediate step of converting to grayscale is used. The associated color depth must be relatively tight. Grayscale, as used herein, means lacking in colors other than black, white and gradations of gray. To "grayscale" an image means to convert it from a colorspace to one including only black, white and gradations of gray. To "binarize" an image means lowering the color depth to one bit, either black (bit set to 1) or white (bit set to 0). In both cases, the nearest color is chosen (e.g. darker colors are converted to black, lighter colors are converted to white).

If the document is RGB ("yes" at 1015), then the process continues at 1020 where image bands are defined over the image. This is similar to what is shown in FIG. 8. If the outcome at 1015 is yes, an iterative process begins at 1020 where for each image band, the image bands are extracted at 1025 and RGB to grayscale conversion of each pixel value is performed at 1030. One way to convert RGB to grayscale is to use the REC .709 weights. REC .709 is a standard used in many industries that involve light and images such as television displays. One formula used to convert RGB to grayscale in 8 bit images (256 levels of grey from 0 to 255) is for each RGB pixel to perform the following conversion:

$$\text{gray} = \left(\left(\frac{R}{255}*0.2125\right) + \left(\frac{G}{255}*0.7152\right) + \left(\frac{B}{255}*0.0722\right)\right)*255$$

The data is then converted to binary at 1050, and the bands are then put into a binary image at 1060. The process moves on to find a rotation angle at 1070 which will be discussed more fully below.

If the outcome of 1015 is no, then the processor checks to see if the image are in grayscale at 1035. If the images are grayscale ("yes" at 1035), then bands are defined at 1040. The image bands are extracted at 1045 and the data is converted to binary data at 1050. Steps 1040, 1045, and 1050 are very similar to steps 1020, 1025, and 1030 from the preceding paragraphs. A simple formula for converting a grayscale pixel into binary in the 8 bit greyscale depth is to use the following expression:

$$\text{binary} = \begin{cases} \text{black}, & \text{gray} < 130 \\ \text{white}, & \text{otherwise} \end{cases}$$

The process then moves to 1060 where the bands are put into a binary image and moves to 1070 where a rotational angle is defined. At this stage, if the image is not binary ("no" at 1055), then there is some unknown error and the process ends at 1095. If the image is binary ("yes" at 1055), then the process continues with defining the rotation angle a 1070.

Specifically, at 1070, the rotation of the particular band is detected to determine if the image on the digital document is skewed at any angle. One example of such a process is to use a minimum area boundary rectangle. Using the rectangle to fully encompass the band, trigonometry can be used to derive the associated angle of the associated band. The angle may be 0, but it may be substantial, such as 5 or 10 degrees. That detected rotation angle may be called θ. With the rotation angle (θ) established at 1070, a mathematical transformation from the non-rotated source pixels at location x, y to the rotated destination $(x_r, y_r)$ is performed. An example operation that may be performed for rotation is:

$$\begin{bmatrix} x_r \\ y_r \end{bmatrix} = \begin{bmatrix} \cos(\theta) & \sin(\theta) \\ -\sin(\theta) & \cos(\theta) \end{bmatrix} * \begin{bmatrix} x \\ y \end{bmatrix}$$

This is the entirety of the image preprocessing (940 in FIG. 9) to prepare the image for translation to correct for misalignment. The process may then end at 1075.

Figure 11:
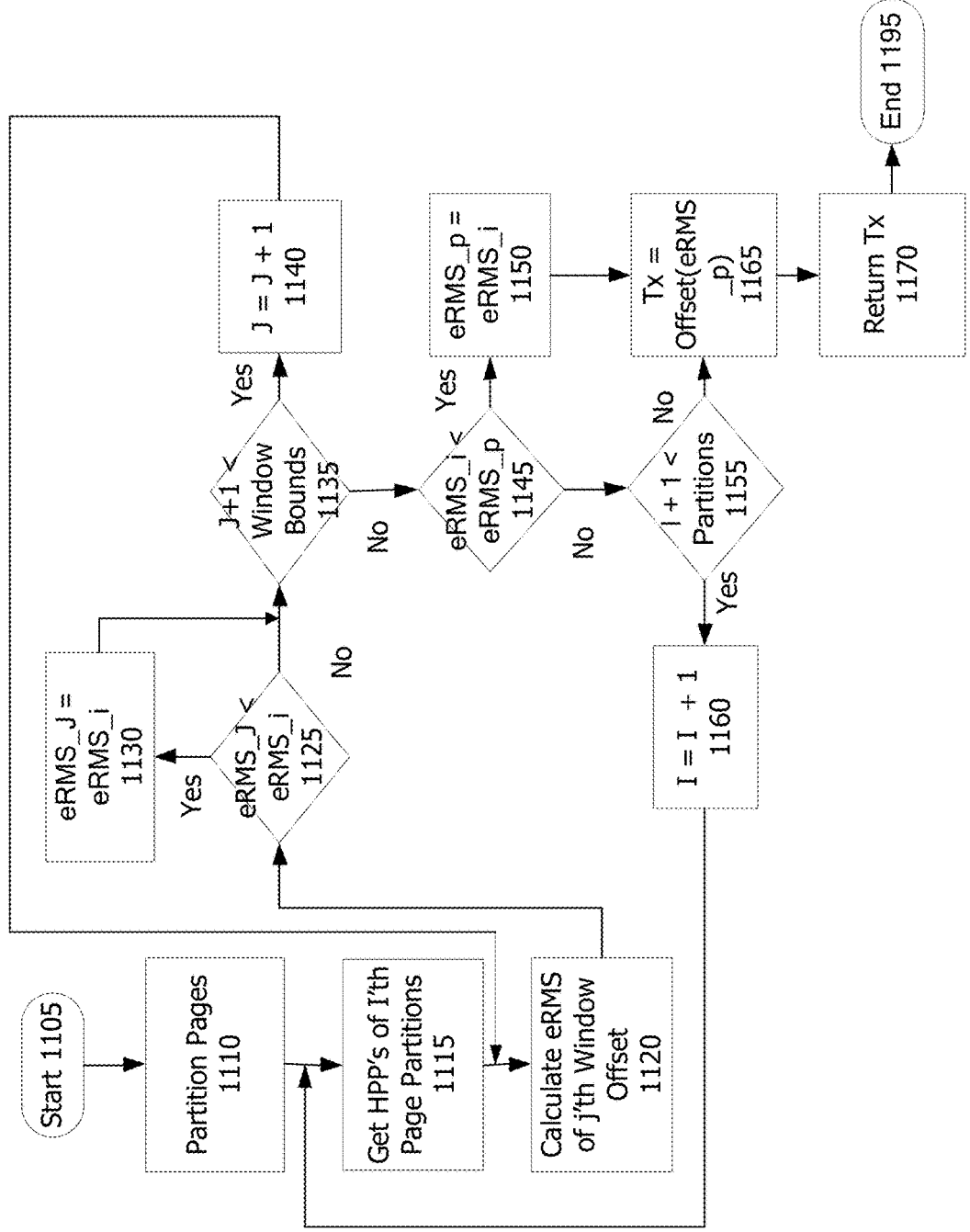
FIG. 11 is a flowchart of a process of projection profile analysis for error minimization.

Turning now to FIG. 11, a flowchart of a process of projection profile analysis for error minimization. This process corresponds to 950 in FIG. 9 such that alignment offset may be computed for achieving minimum difference squared error. The process starts at 1105 and ends at 1195. Following the start (e.g. 940 in FIG. 9), the pages are partitioned as shown in FIG. 8. These partitions preferably evenly divide the entire digital image. In this way, the page partitions correspond to the full width and height of the image. Following 1110, the process goes to 1115 where the process extracts the horizontal projection profile (HPP) of each corresponding page partition. A projection profile is defined as the sum of black pixels across parallel lines over the width or height of an image (or image partition in this case). The, horizontal projection profiles (HPP) may also be described by the following equation:

$$HPP(x) = \sum_{1 \leq y \leq h} f(x, y)$$

where, $f(x, y)$ = Pixel value at row $x$ and column $y$

Using this, the horizontal projection profiles of the i'th front and back page partitions are established in 1115. The i'th partition is one of the partitions into which each image is divided (e.g. the second partition on the front and back of the digital page). The process then moves to step 1120 which is an error minimization routine and the calculation of eRMS_p (minimum Root Mean Squared error for a corresponding offset value for the current partition). Step 1120 operates to describe a loop over a set of candidate offset values T. To describe this process, the projection profile error between columns x and x+j may be evaluated as:

$$e_{hpp}(x,x+j) = (HPP_{if}(x) - HPP_{ib}(x+j))^2$$

Therefore, for the duplex pair without any offset (i.e. j=0), the initial HPP error is calculated as the root mean squared, or:

$$eRMS_{j=0} = \sqrt{\frac{\sum_{1 \leq x \leq w} e_{hpp}(x, x + j)}{w}}$$

Steps 1125, 1130, 1135, and 1140 are used to find the j value that minimizes the error between the projection profiles of the current page partition. The j value may also be found by offsetting the projection profile of the back page over an empirical (derived from experimentation) window of offset values obtained by experimentation and knowledge of the hardware limitations of the MFP. The following equation may be used:

$$eRMS\_i = \min(eRMS_{j=0}, eRMS_{j=1}, eRMS_{j=2}, \ldots)$$

Following this process, 1145, 1150, 1155, and 1160 describe how the eRMS_i value is compared against the eRMS_p value, which corresponds to the minimum error and offset from processing previous page partitions. The page partitioning mechanism has been described previously and is illustrated in FIG. 8. If a previous page partition had a larger eRMS_i value, the outcome of 1145 will be a yes and the new page minimum error and corresponding offset will be set to the current page partition error and offset as in 1150. Steps 1155 and 1160 then continue the entire process on additional page partitions if required; otherwise step 1165 calculates the offset value corresponding to the eRMS_p value most recently set and then the associated Tx value is returned at 1170.

Figure 12A:
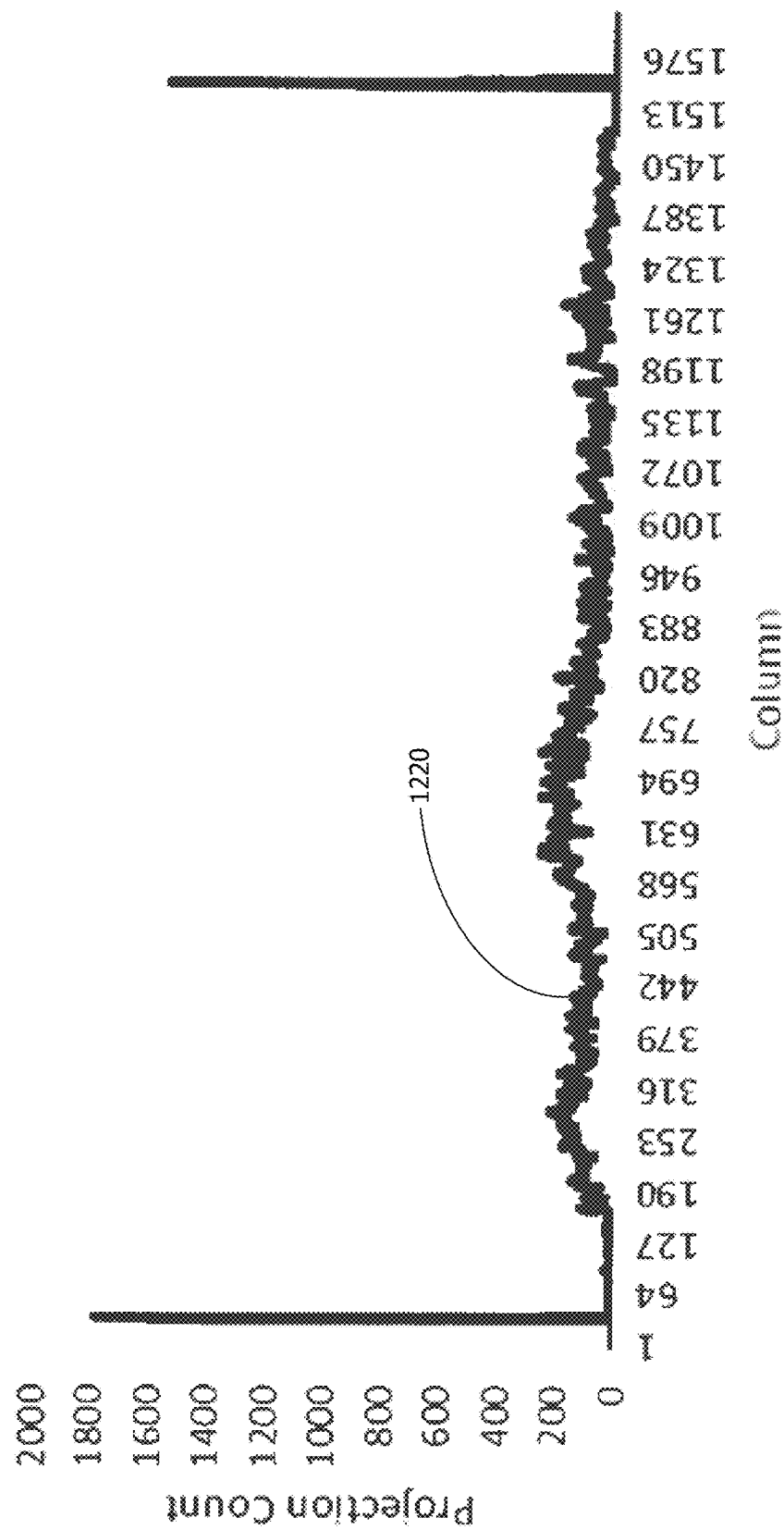
FIG. 12A is test data regarding front page HPP.
Figure 12B:
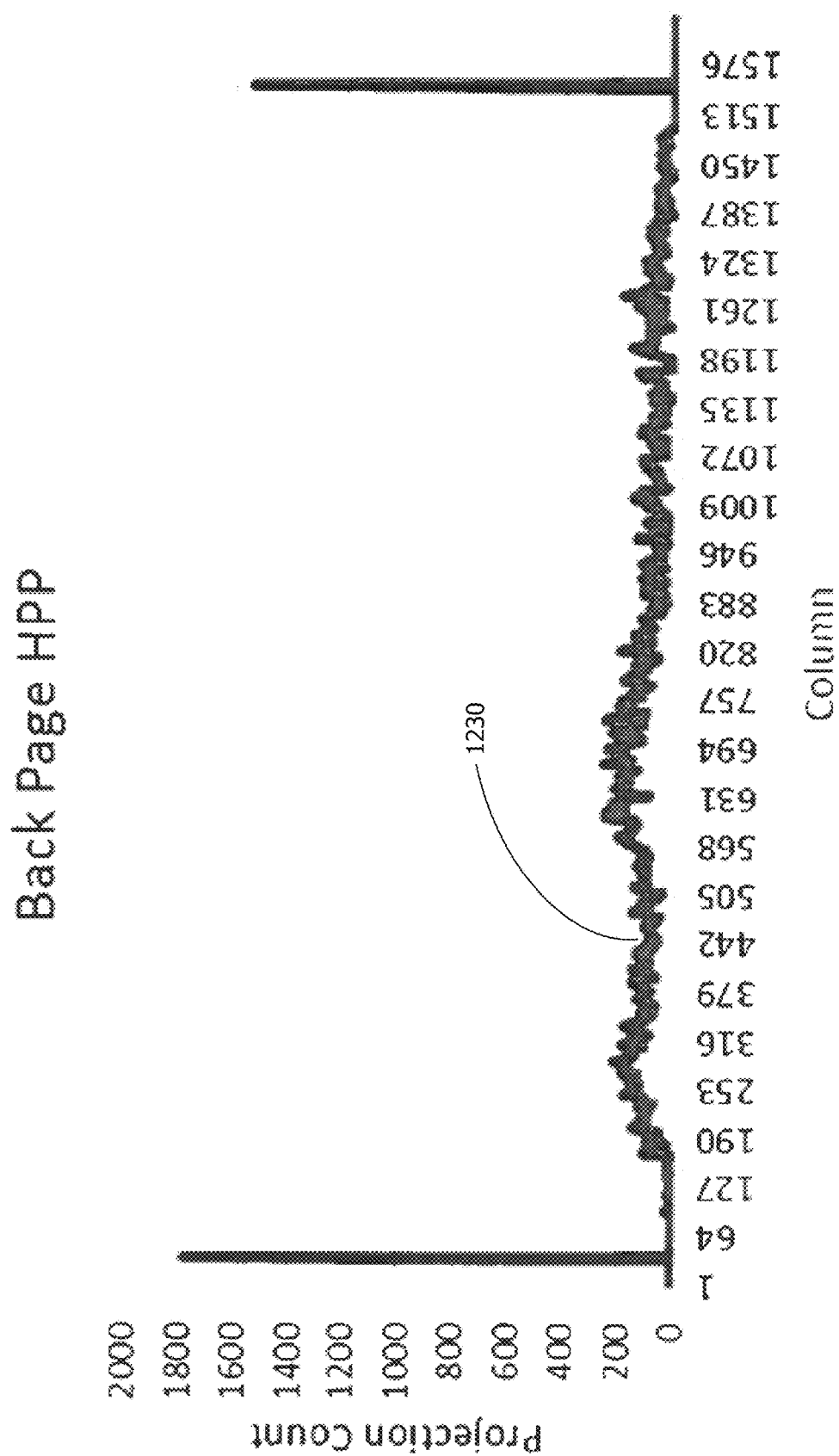
FIG. 12B is test data regarding back page HPP.
Figure 12C:
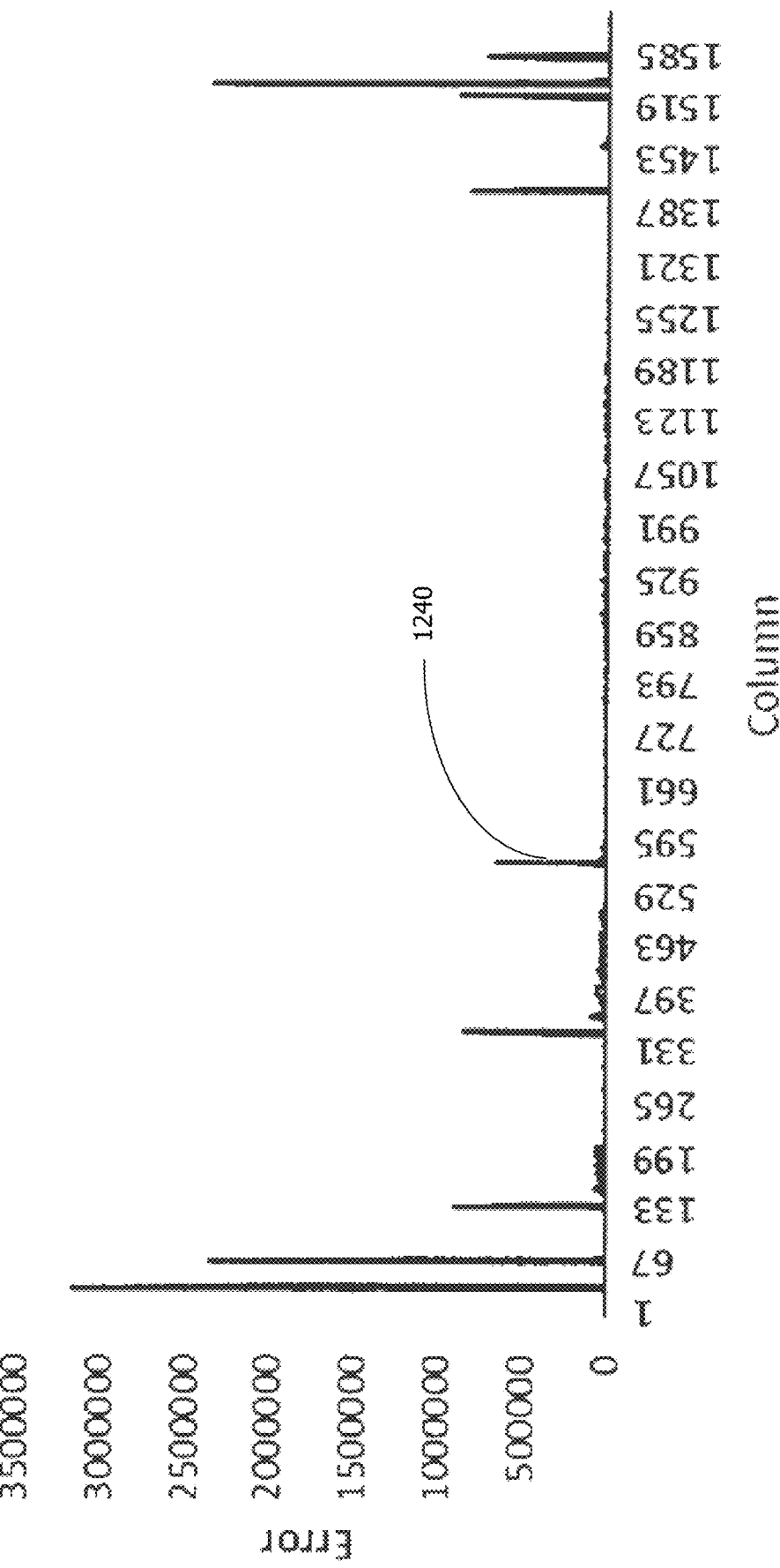
FIG. 12C is the difference squared error between HPP data in FIGS. 12A and 12B.
Figure 12D:
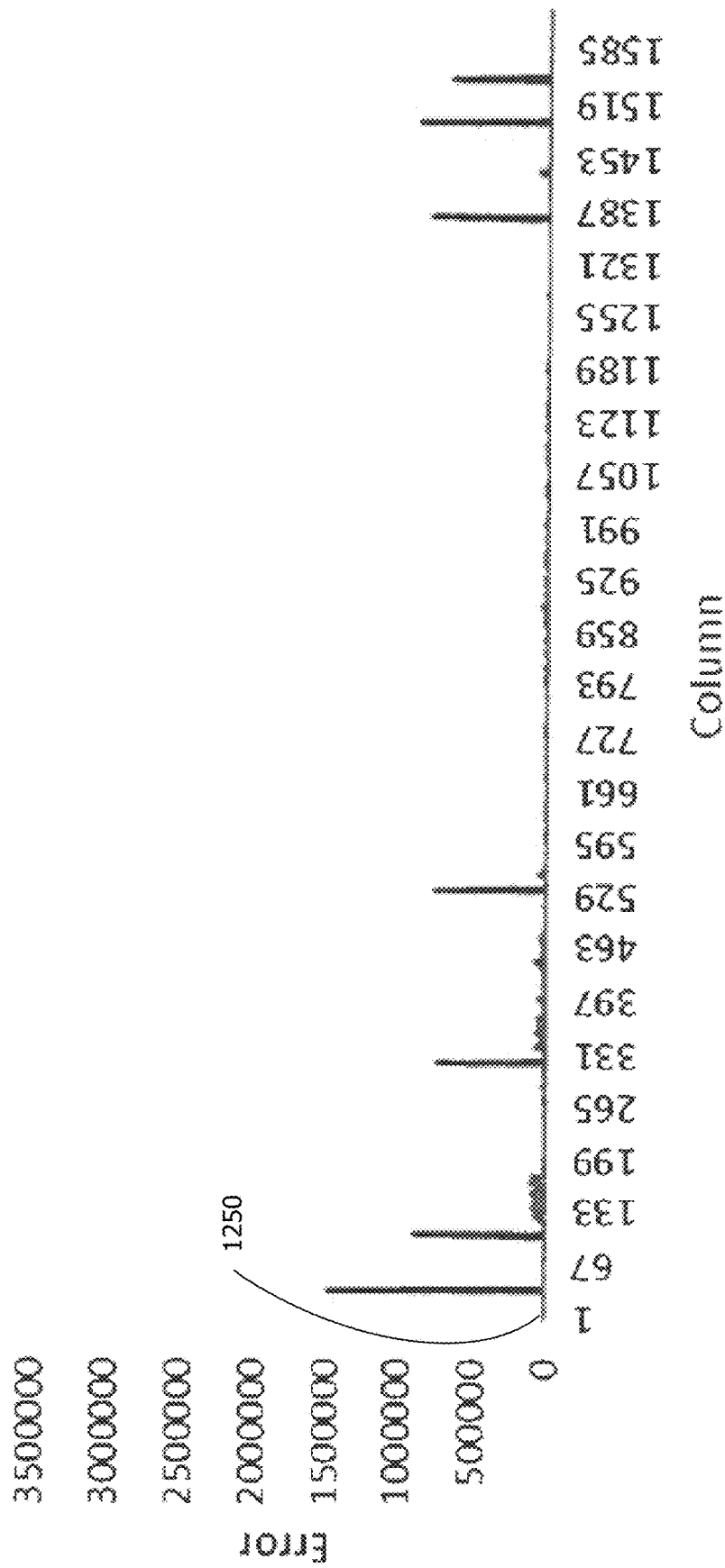
FIG. 12D is the projection profile error between HPP data in FIGS. 12A and 12B at horizontal offset value of 35.

FIGS. 12A, 12B, 12C, and 12D show test data regarding how horizontal projection profiles may be used to fix misalignment. To exemplify how the present disclosure solves the problem, consider the following horizontal projection profiles corresponding to the duplex pair in FIG. 8, with only one page partition (being the full image) being used for analysis. FIG. 12A shows a graph of front page horizontal projection profiles, FIG. 12B shows the horizontal projection profiles of the back page. Note how the raw data on both pages appears fuzzy. Data points near 1220 and 1230 both appear jagged and somewhat unrefined. Though the data on both pages is true, to the human eye, it is difficult to read or find a correlation. To deal with this "fuzziness", the difference in projection profile error between FIGS. 12A and 12B is taken and then squared. This results in a strong emphasis of differences between the two images. The data points on this page are much more refined such as point 1240 in FIG. 12C. FIG. 12C has an entire line of these squared values. The value of $eRMS_{j=0}$ is 136.85. This can be seen on the graph at 1250 (FIG. 12D). Through the above mechanism, $eRMS_{j=35}$ is evaluated as 111.78 as illustrated in FIG. 12D.

Although the $RMS_{35}$ error significantly improves upon $RMS_0$, it is still possible that another offset value results in a smaller error. Therefore, the PPEM routine, which utilizes the offset window described with reference to FIG. 11, determines the j value that most significantly minimizes the error. To illustrate this, the $RMS_{j=30}$ to $RMS_{j=39}$ values for each offset used for determining the minimum error are shown in FIG. 13.

Figure 13:
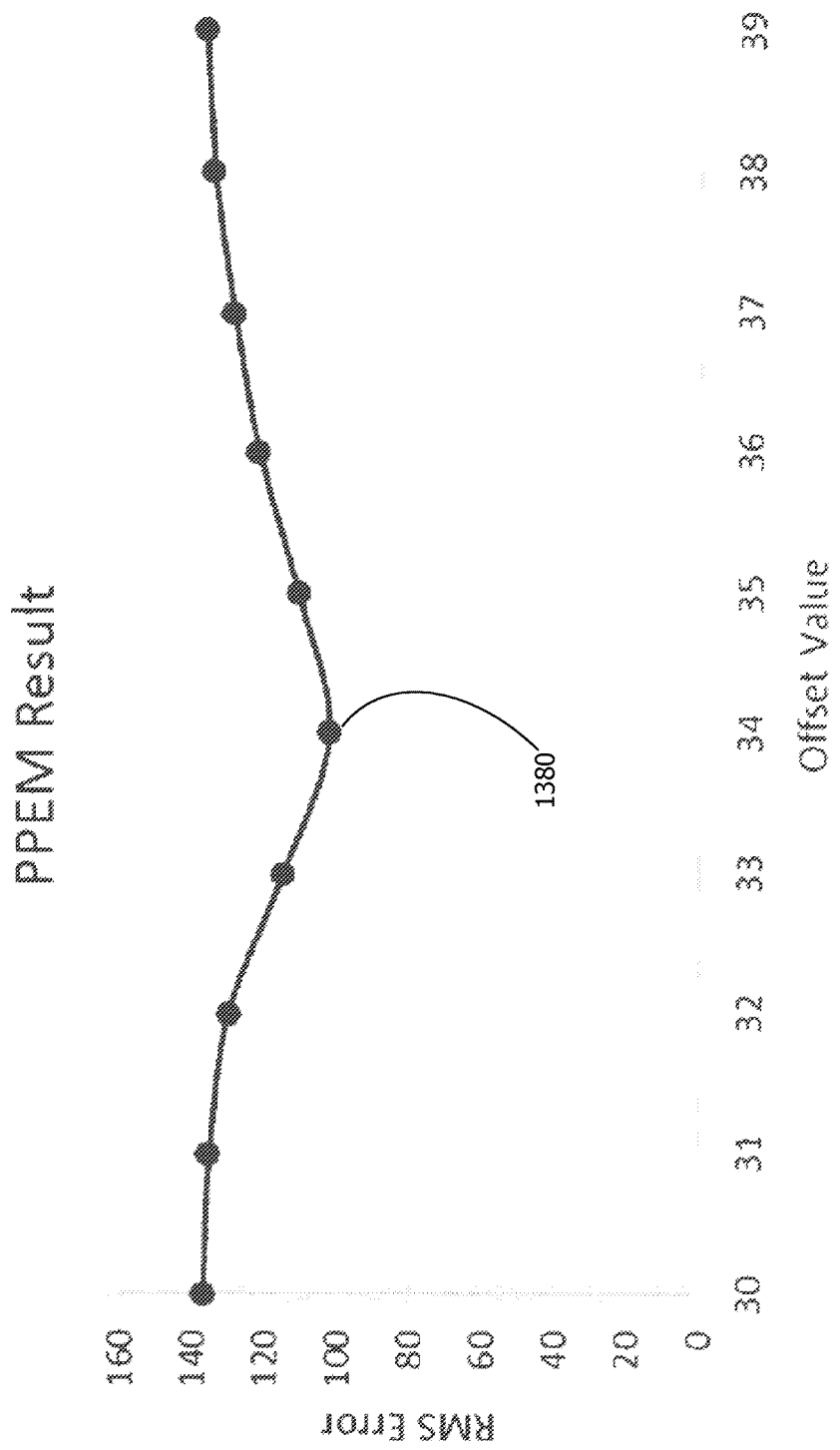
FIG. 13 is the PPEM result with a minimum value shown.

As illustrated in FIG. 13, the minimum value, 1380, appears at RMS34. Therefore, the value of 34 is the one that most minimizes error and is thus the required translation factor for duplex pair alignment, which is selected. The translation (980 in FIG. 9) is used with this as the Tx offset (1165 in FIG. 11). Similar method to Tx is then used to determine the vertical offset translation factor Ty.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system comprising a computing device including:
   a processor;
   a display device coupled to the processor;
   a memory coupled to the processor, the memory storing program instructions that, when executed cause the computing device to perform actions comprising:

scanning a physical document via an optical scanner module and creating a digital document from the physical document;
detecting a back page and a front page of the digital document;
pre-processing the digital document by performing binarization and skew correction on the back page and the front page;
performing horizontal and vertical projection profile analysis on the binarized front and back pages;
calculating horizontal and vertical offsets using projection profile error minimization on the binarized front and back pages; and
translating the contents of the digital document based on the horizontal and vertical alignment offsets.

2. The system of claim 1, wherein pre-processing comprises reducing the digital document from RGB colorspace to grayscale.

3. The system of claim 2, wherein pre-processing further comprises:
determining whether an image on a page of the digital document is composed of red, green, and blue;
partitioning the page of the digital document into image bands;
converting each pixel within each of the partitioned image bands into grayscale;
generating a binary image based on the grayscale partitioned image bands; and
transforming the page of the digital document based on a rotational angle detected within the image.

4. The system of claim 1, wherein the projection profile error minimization comprises:
partitioning the digital document into at least two partitions for each of the front and back page images;
detecting an offset value of the x axis for the digital document;
determining an offset value of each of the at least two partitions; and
translating the front and back page images by an amount that minimizes an offset value.

5. The system of claim 4, wherein a default translation value is used to translate the front and back page images, the default translation value determined by empirical evaluation of multiple documents fed through a scanner.

6. The system of claim 1, wherein a projection profile error and the horizontal and vertical alignment offsets calculated for one document set are used for an entire group of documents.

7. A non-transitory machine-readable medium storing a program having instructions which when executed, will cause a processor to:
scan a physical document via an optical scanner module and create a digital document from the physical document;
detect a back page and a front page of the digital document;
pre-process the digital document by performing binarization and skew correction on the back page and the front page;
perform horizontal and vertical projection profile analysis on the binarized page;
perform horizontal and vertical offset calculations via projection profile error minimization on the binarized page; and
translate the contents of the digital document based on the horizontal and vertical alignment offsets.

8. The non-transitory machine readable medium of claim 7, wherein pre-processing comprises reducing the digital document from RGB colorspace to grayscale.

9. The non-transitory machine readable medium of claim 8, wherein pre-processing for binarization and skew correction further comprises:
determining whether an image on a page of the digital document is composed of red, green, and blue;
partitioning the page of the digital document into image bands;
converting each pixel within each of the partitioned image bands into grayscale;
generating a binary image based on the grayscale partitioned image bands; and
transforming the page of the digital document based on a rotational angle detected within the image.

10. The non-transitory machine readable medium of claim 7, wherein the projection profile error minimization comprises:
partitioning the digital document into at least two partitions for each of the front and back page images;
detecting an offset value of the x axis for the digital document;
determining an offset value of each of the at least two partitions; and
translating the front and back page images by an amount that minimizes an offset value.

11. The non-transitory machine readable medium of claim 10, wherein a default translation value is used to translate the front and back page images, the default translation value determined by empirical evaluation of multiple documents fed through a scanner.

12. The non-transitory machine readable medium of claim 7, wherein a projection profile error and the horizontal and vertical alignment offsets calculated for one document set are used for an entire group of documents.

13. A method of aligning content in a duplex scanner, comprising:
scanning a physical document via an optical scanner module and creating a digital document from the physical document;
detecting a back page and a front page of the digital document;
pre-processing the digital document by performing binarization and skew correction on the back page and the front page;
performing horizontal and vertical projection profile analysis on the binarized front and back pages;
calculating horizontal and vertical offsets using projection profile error minimization on the binarized front and back pages; and
translating the contents of the digital document based on the horizontal and vertical alignment offsets.

14. The method of claim 13, wherein pre-processing comprises reducing the digital document from RGB colorspace to grayscale.

15. The method of claim 14, wherein pre-processing further comprises:
determining whether an image on a page of the digital document is composed of red, green, and blue;
partitioning the page of the digital document into image bands;
converting each pixel within each of the partitioned image bands into grayscale;
generating a binary image based on the grayscale partitioned image bands; and transforming the page of the digital document based on a rotational angle detected within the image.

16. The method of claim 13, wherein the projection profile error minimization comprises:
partitioning the digital document into at least two partitions for each of the front and back page images;
detecting an offset value of the x axis for the digital document;
determining an offset value of each of the at least two partitions; and
translating the front and back page images by an amount that minimizes an offset value.

17. The method of claim 16, wherein a default translation value is used to translate the front and back page images, the default translation value determined by empirical evaluation of multiple documents fed through a scanner.

18. The method of claim 13, wherein a projection profile error and the horizontal and vertical alignment offsets calculated for one document set are used for an entire group of documents.

* * * * *